(12) United States Patent
Chen

(10) Patent No.: US 10,317,747 B2
(45) Date of Patent: Jun. 11, 2019

(54) LIQUID CRYSTAL PANEL AND LIQUID CRYSTAL DISPLAY DEVICE

(71) Applicant: Shenzhen China Star Optoelectronics Technology Co., Ltd., Shenzhen, Guangdong (CN)

(72) Inventor: Lixuan Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 60 days.

(21) Appl. No.: 15/512,840

(22) PCT Filed: Mar. 14, 2017

(86) PCT No.: PCT/CN2017/076562
§ 371 (c)(1),
(2) Date: Mar. 20, 2017

(87) PCT Pub. No.: WO2018/152886
PCT Pub. Date: Aug. 30, 2018

(65) Prior Publication Data
US 2018/0239200 A1   Aug. 23, 2018

(30) Foreign Application Priority Data
Feb. 23, 2017 (CN) .......................... 2017 1 0098480

(51) Int. Cl.
*G02F 1/1343* (2006.01)
*G02F 1/1362* (2006.01)
(Continued)

(52) U.S. Cl.
CPC .... *G02F 1/134309* (2013.01); *G02F 1/13439* (2013.01); *G02F 1/133528* (2013.01);
(Continued)

(58) Field of Classification Search
CPC .................................................... G02F 1/1343
See application file for complete search history.

(56) References Cited

U.S. PATENT DOCUMENTS 7,450,208 B2 * 11/2008 Lu ..................... G02F 1/134309
349/129
2004/0004690 A1    6/2004 Yamaguchi
(Continued)

FOREIGN PATENT DOCUMENTS

CN      101968585 A    2/2011
CN      104160326 A    11/2014
(Continued)

*Primary Examiner* — Sang V Nguyen
(74) *Attorney, Agent, or Firm* — Andrew C. Cheng

(57) ABSTRACT

The present disclosure discloses a liquid crystal panel including a first polarizer, an array substrate, a color film substrate, and a second polarizer disposed in this order, a plurality of pixel structures are arranged in the array of the array substrate, the pixel structure includes a pixel electrode; the display area portion of the pixel electrode includes a striped horizontal trunk and a striped vertical trunk, a plurality of stripe branches are divided into four quadrant sub-regions each of which is divided equally between the horizontal trunk and the vertical trunk center; wherein the angle between the absorption axis of the first polarizer and the horizontal trunk is α, the absorption axis of the second polarizer is perpendicular to the absorption axis of the first polarizer, and 0<α<90°. The present disclosure also discloses a liquid crystal display device including a liquid crystal panel as described above.

13 Claims, 4 Drawing Sheets

(51) Int. Cl.
    *G02F 1/1335* (2006.01)
    *G02F 1/1368* (2006.01)
(52) U.S. Cl.
    CPC .. *G02F 1/136213* (2013.01); *G02F 1/136286*
    (2013.01); *G02F 1/1368* (2013.01); *G02F*
    *2001/133531* (2013.01); *G02F 2201/121*
    (2013.01); *G02F 2201/122* (2013.01); *G02F*
    *2201/123* (2013.01)

(56) References Cited

U.S. PATENT DOCUMENTS

| | | | | |
|---|---|---|---|---|
| 2005/0092991 | A1* | 5/2005 | Ahn | G02F 1/134363 |
| | | | | 257/59 |
| 2005/0219435 | A1* | 10/2005 | Oh | G02F 1/13454 |
| | | | | 349/43 |
| 2006/0220014 | A1* | 10/2006 | Hirano | G02F 1/136213 |
| | | | | 257/59 |
| 2009/0284693 | A1* | 11/2009 | Adachi | G02F 1/133555 |
| | | | | 349/98 |
| 2009/0284703 | A1* | 11/2009 | Shoraku | G02F 1/133753 |
| | | | | 349/129 |
| 2011/0102713 | A1* | 5/2011 | Hashimoto | G02F 1/133512 |
| | | | | 349/99 |
| 2011/0310335 | A1* | 12/2011 | Hashimoto | G02F 1/133707 |
| | | | | 349/96 |
| 2012/0068916 | A1* | 3/2012 | Tsubata | G02F 1/1362 |
| | | | | 345/94 |
| 2012/0307172 | A1* | 12/2012 | Yoshida | G02F 1/133707 |
| | | | | 349/43 |
| 2013/0321725 | A1* | 12/2013 | Hirosawa | G02F 1/134363 |
| | | | | 349/37 |
| 2015/0085228 | A1* | 3/2015 | Kang | G02F 1/133528 |
| | | | | 349/98 |
| 2015/0124202 | A1* | 5/2015 | Kang | G02F 1/133707 |
| | | | | 349/98 |

FOREIGN PATENT DOCUMENTS

| | | | | |
|---|---|---|---|---|
| CN | 104280944 | * | 1/2015 | ........... G02F 1/1333 |
| CN | 104280944 | A | 1/2015 | |
| CN | 105487310 | A | 4/2016 | |
| JP | 200375851 | A | 3/2003 | |
| TW | 201120542 | A1 | 6/2011 | |

* cited by examiner

LIQUID CRYSTAL PANEL AND LIQUID CRYSTAL DISPLAY DEVICE

FIELD OF THE DISCLOSURE

The present disclosure relates to a display device technology field, and more particularly to a liquid crystal panel and a display device.

BACKGROUND OF THE DISCLOSURE

With the development of display technology, liquid crystal display (LCD) has become the most common display device. Among them, vertical alignment (VA) type liquid crystal display because of the wide viewing angle, high contrast advantages, has become the mainstream products on the market. At present, with the high demand for customers, the need to develop higher contrast LCD. High contrast means that the white screen brightness does not decline in the case, as far as possible to reduce the backlight has been open when the LCD black screen light leakage phenomenon, the light depends on the backlight design, but also depends on the LCD design and polarizer design. Among them, the pixel structure in the liquid crystal cell (Cell) has a significant impact on the light leakage, how to minimize the leakage of light to improve the contrast is the industry are seeking to solve the problem.

SUMMARY OF THE DISCLOSURE

In view of the deficiencies of the prior art, the present disclosure provides a pixel structure which can effectively reduce light leakage and improve contrast.

In order to achieve the above object, the present disclosure adopts the following technical scheme:

a liquid crystal panel includes a first polarizer, an array substrate, a color film substrate and a second polarizer followed by stacking, liquid crystal molecules are arranged between the color film substrate and the array substrate, a plurality of pixel structures are arranged in the array of the array substrate, the pixel structure includes a pixel electrode; wherein, the pixel electrode includes a display area, the display area portion of the pixel electrode includes a striped horizontal trunk and a striped vertical trunk, the horizontal trunk intersects the vertical trunk at a central position perpendicularly; a plurality of stripe branches are divided into four quadrant sub-regions each of which is divided equally between the horizontal trunk and the vertical trunk center; wherein, the stripe branches located in the first quadrant sub-region and the third quadrant sub-region are perpendicular to the horizontal trunk, the stripe branches located in the second quadrant sub-region and the fourth quadrant sub-region are parallel to the horizontal trunk; or, the stripe branches located in the first quadrant sub-region and the third quadrant sub-region are parallel to the horizontal trunk, the stripe branches located in the second quadrant sub-region and the fourth quadrant sub-region are perpendicular to the horizontal trunk; wherein the angle between the absorption axis of the first polarizer and the horizontal trunk is α, the absorption axis of the second polarizer is perpendicular to the absorption axis of the first polarizer, and 0<α<90°.

Wherein, 30°≤α≤60°.

Wherein, α=45°.

Wherein, the display area of the pixel electrode is rotationally symmetric 90° at its center point.

Wherein, the pixel structure further includes a scan line and a data line, the scan line and the data line intersect each other with a specific pixel unit, the pixel unit includes a pixel driver and the pixel electrode, the pixel electrode is connected to the scan line and the data line through the pixel driver.

Wherein, the pixel driver is a thin film transistor.

Wherein, the pixel unit further includes a common electrode line, the common electrode line and the pixel electrode are arranged in a different layer structure, the pixel electrode further includes a non-display area surrounding the display area, the positive projection of the common electrode line on the pixel electrode is located within the non-display area, and a storage capacitor is formed between common electrode line and the non-display area of the pixel electrode.

The present disclosure further provides a liquid crystal display device including a liquid crystal panel and a backlight module, the liquid crystal panel is relative arranged with the backlight module, the backlight module provides a display light source to the liquid crystal panel for the liquid crystal panel to display the image, wherein the liquid crystal panel is the liquid crystal panel as described above.

Compared with the prior art, the liquid crystal panel and the liquid crystal display device provided by the present embodiment are arranged the stripe branches in the pixel electrode in parallel or perpendicular to the horizontal axis (horizontal trunk) direction, And the light absorption axis of the polarizer is set to have an angle greater than 0 and less than 90° with the horizontal axis, it is possible to reduce the light leakage caused by the diffraction of the polarized light by the metal wire in the pixel structure and to improve the contrast.

DETAILED DESCRIPTION OF PREFERRED EMBODIMENTS

Figure 1:
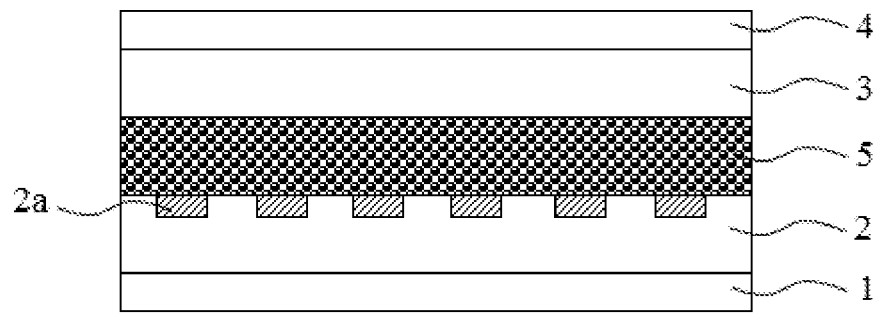
FIG. 1 is a schematic structural view of the liquid crystal panel of the embodiment of the present disclosure.

For the purposes, technical solutions, and advantages of the present disclosure will become more apparent below with reference to the specific embodiments of the present disclosure will be described in detail. Examples of such preferred embodiments have been illustrated in the accompanying drawings. As shown in the drawings according to an embodiment of the present disclosure and the accompanying drawings described are only exemplary, and the present disclosure is not limited to these embodiments.

Here, it should be noted that, in order to avoid unnecessary detail obscure the present disclosure, in the drawings only shows a structure and/or processing steps according to the present disclosure are closely related, and omitted other details of the present disclosure has little relationship.

The present embodiment first provides a liquid crystal panel, as shown in the FIG. 1, the liquid crystal panel includes a first polarizer 1, an array substrate 2, a color film substrate 3 and a second polarizer 4 followed by stacking, liquid crystal molecules 5 are arranged between the color film substrate 3 and the array substrate 2, a plurality of pixel structures 2a are arranged in the array substrate 2.

Figure 2:
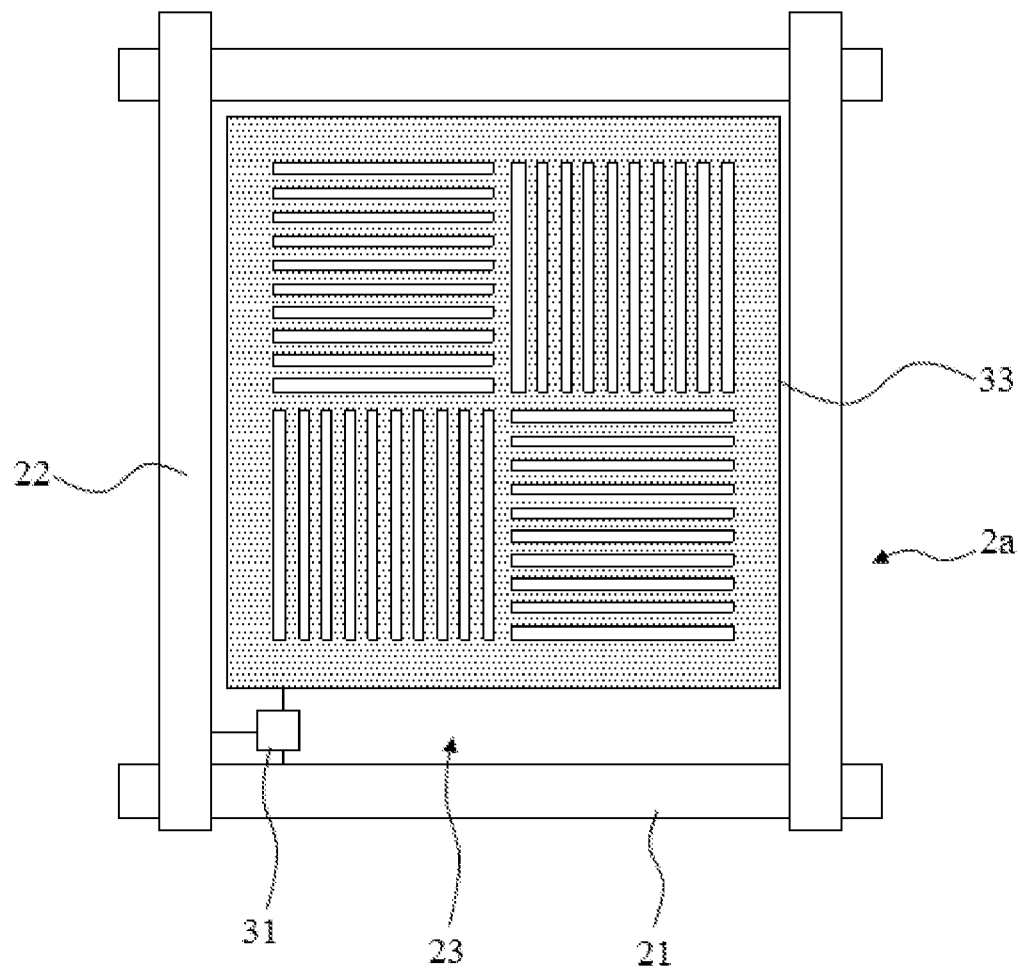
FIG. 2 is a schematic structural view of the pixel structure of the embodiment of the present disclosure.

Wherein, as shown in FIG. 2, the pixel structure includes a scan line 21 and a data line 22, the scan line 21 and the data line 22 intersect each other with a specific pixel unit 23, the pixel unit 23 includes a pixel driver 31 and the pixel electrode 33, the pixel electrode 33 is connected to the scan line 21 and the data line 22 through the pixel driver 31. Wherein, the pixel driver 31 is a thin film transistor, the gate of the thin film transistor is connected to the scan line 21, the source of the thin film transistor is connected to the data line 22, the drain of the thin film transistor is connected to the pixel electrode 33.

Figure 3:
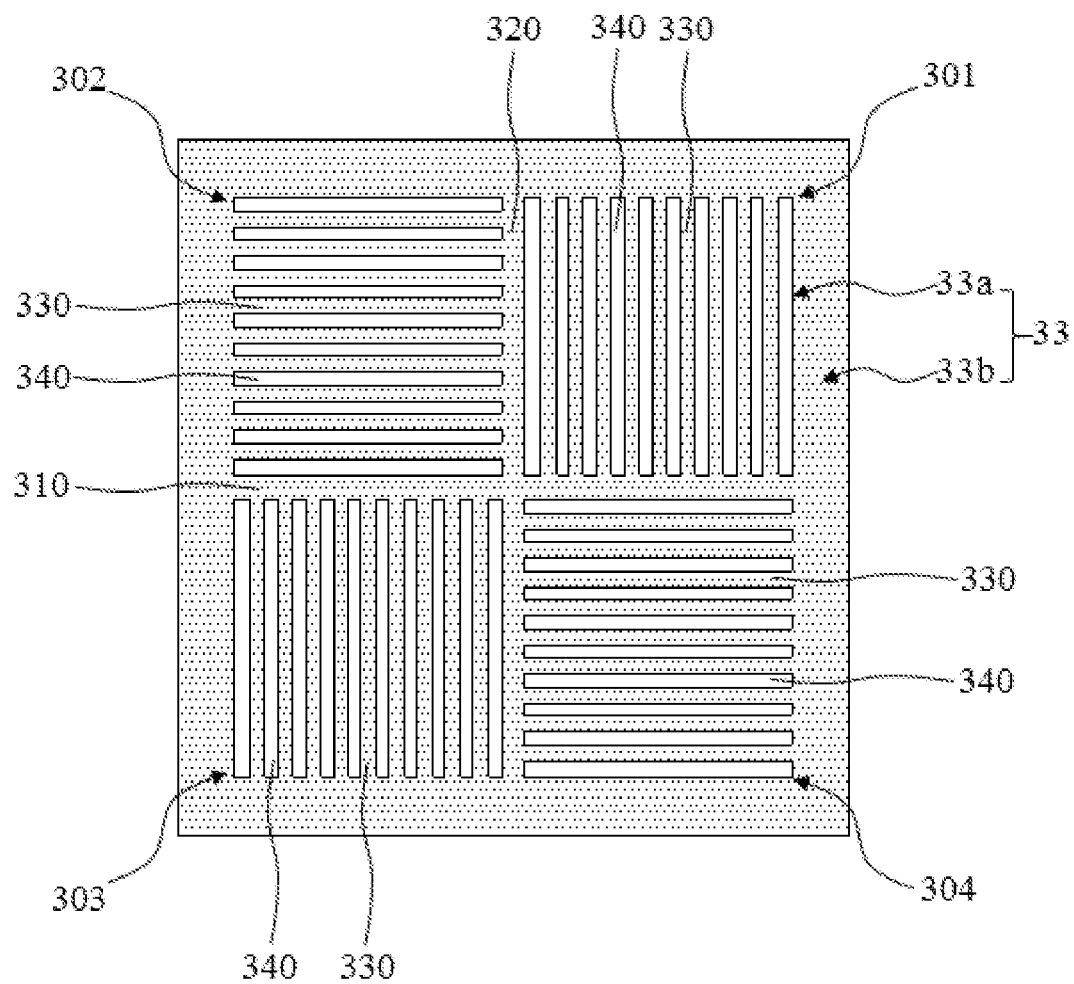
FIG. 3 is a schematic structural view of the pixel electrode of the embodiment of the present disclosure.

Wherein, as shown in FIG. 3, the pixel electrode 33 includes a display area 33a and a non-display area 33b surrounding the display area 33a. the display area 33a of the pixel electrode 33 includes a striped horizontal trunk 310 and a striped vertical trunk 320, the horizontal trunk 310 intersects the vertical trunk 320 at a central position perpendicularly. A plurality of stripe branches 330 are divided into four quadrant sub-regions 301, 302, 303, 304 each of which is divided equally between the horizontal trunk 310 and the vertical trunk center 320, one end of each of the strip branches being connected to the horizontal trunk 310 or the vertical trunk 320 and the other end being connected to the non-display area 33b portion of the pixel electrode 33, and there is slit 340 between any two adjacent strip branches 330.

Figure 4:
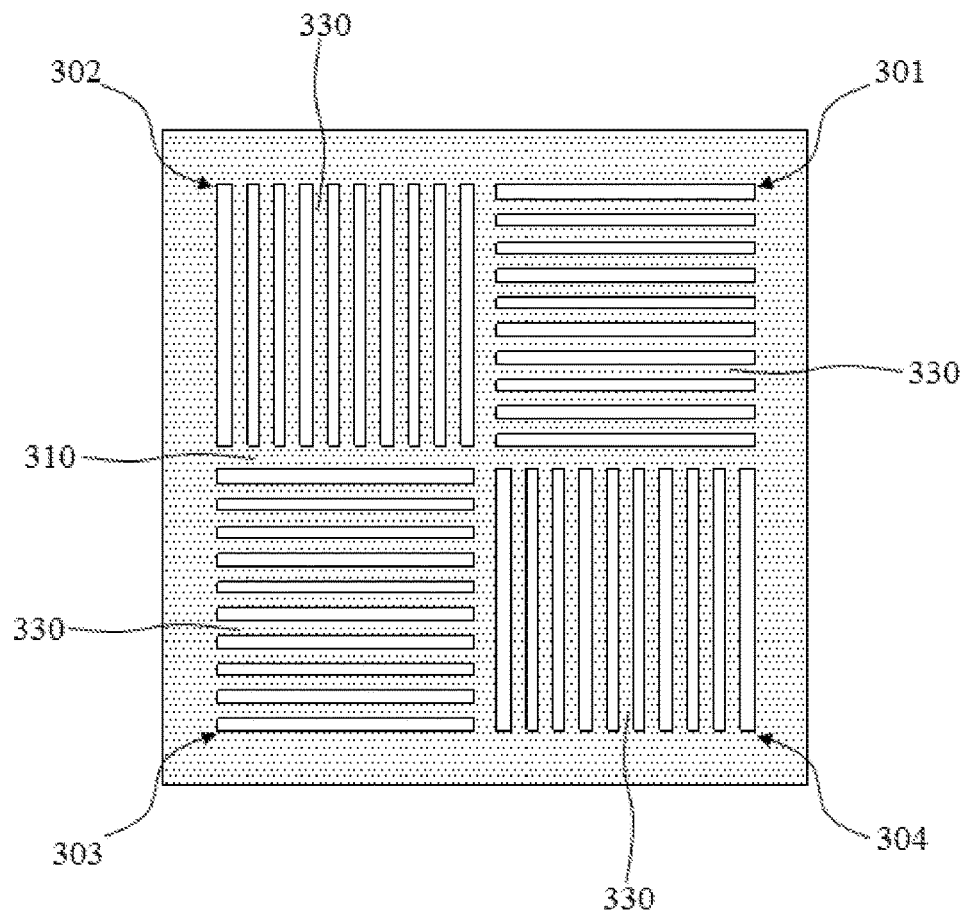
FIG. 4 is a schematic structural view of the pixel electrode of another embodiment of the present disclosure.

In the present embodiment, as shown in FIG. 3, the stripe branches 330 located in the first quadrant sub-region 301 and the third quadrant sub-region 303 are perpendicular to the horizontal trunk 310, the stripe branches 330 located in the second quadrant sub-region 302 and the fourth quadrant sub-region 304 are parallel to the horizontal trunk 310. It should be noted that, in still other embodiments, it may be set as such: as shown in FIG. 4, the stripe branches 330 located in the first quadrant sub-region 301 and the third quadrant sub-region 302 are parallel to the horizontal trunk 310, the stripe branches 330 located in the second quadrant sub-region 302 and the fourth quadrant sub-region 304 are perpendicular to the horizontal trunk 310.

Further, in the present embodiment, the strip-like branches 330 in the four quadrant sub-regions 301, 302, 303, 304 have the same width, and the width of the slits 340 between the adjacent two stripe branches 330 is exactly the same, thus, the display area portion 33a of the pixel electrode 33 has a rotational symmetry of 90° with respect to its center point.

Figure 5:
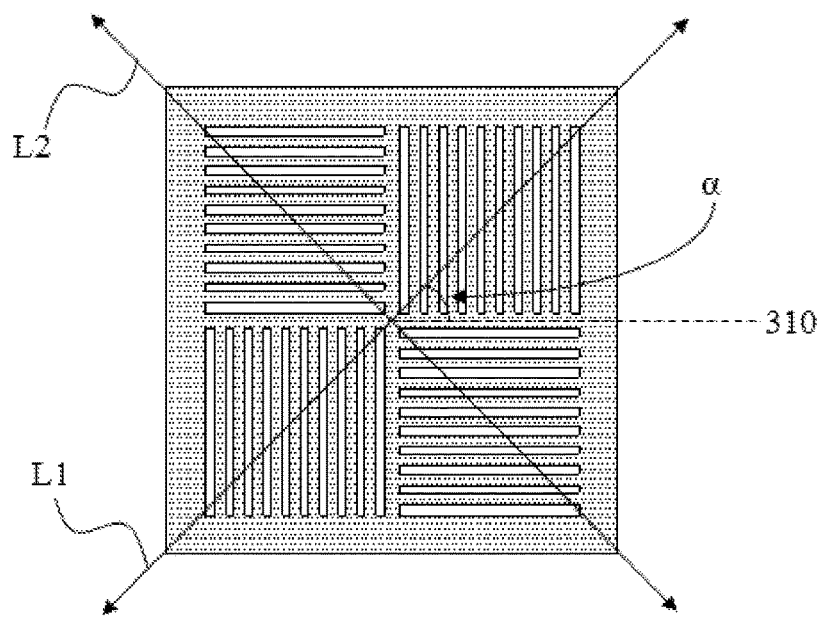
FIG. 5 is an exemplary illustration of the positional relationship between the absorption axis of the polarizer and the horizontal axis of the pixel electrode in the embodiment of the present disclosure.

In order to reduce the light leakage caused by the diffraction of the polarized light by the metal lines in the pixel structure as much as possible, in the present disclosure, the light absorption axis of the first polarizer 1 is set to have an angle α greater than 0 and less than 90° with respect to the horizontal axis, the absorption axis of the second polarizer 4 is perpendicular to the absorption axis of the first polarizer 1. FIG. 5 is an exemplary illustration of the positional relationship between the absorption axis of the polarizer and the horizontal axis of the pixel electrode in the embodiment of the present disclosure, in the figure, L1 represents the light absorption axis of the first polarizer 1, L2 represents the light absorption axis of the second polarizer 4. Among them, the angle α is more preferably 30° to 60°, and most preferably 45°. When α=45°, the relative angle between the absorption axis L1 of the first polarizer 1 and the stripe branch 330 in the four quadrant sub-regions 301, 302, 303, 304 of the pixel electrode 33 are 45°, while reducing the leakage of light, but also to maximize the incident light to enhance the light transmittance.

Figure 6:
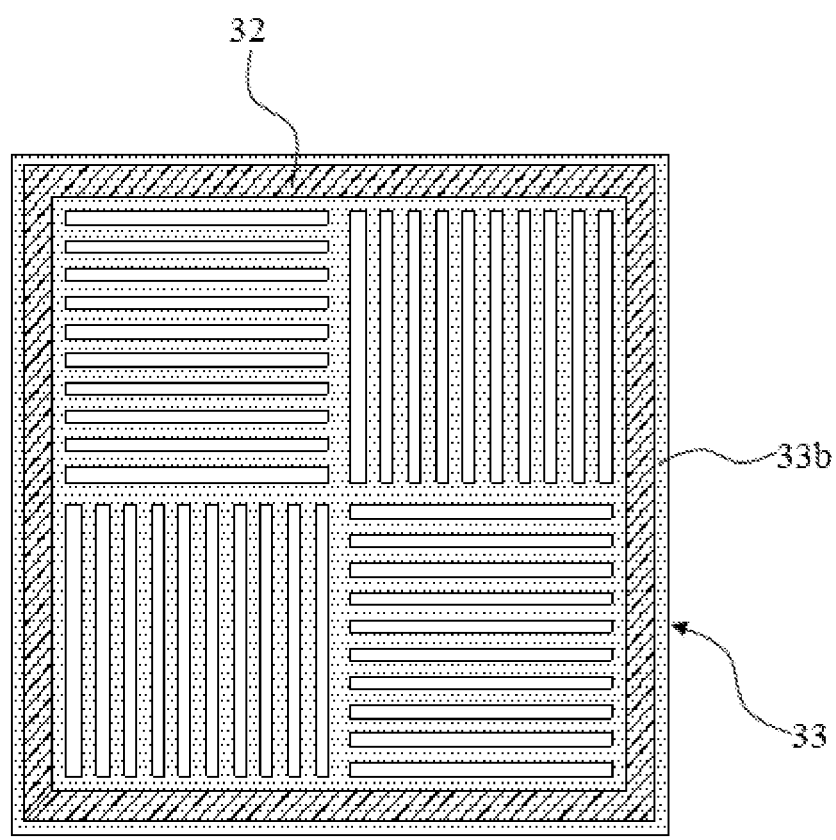
FIG. 6 is an exemplary illustration of the projection of the common electrode line on the pixel electrode in the embodiment of the present disclosure.

Further, the pixel unit 23 further includes a common electrode line, the common electrode line and the pixel electrode are arranged in a different layer structure, and there is an insulating layer therebetween. In the present embodiment, as shown in FIG. 6, the positive projection of the common electrode line 32 on the pixel electrode 33 is located within the non-display area 33b, and a storage capacitor is formed between common electrode line 32 and the non-display area 33b of the pixel electrode 33. The common electrode line 32 is arranged in the non-display region 33b, and the common electrode line 32 is prevented from diffracting the incident polarized light to generate light leakage, effectively reducing the degree of light leakage of the pixel structure and improving the contrast of the liquid crystal display.

Figure 7:
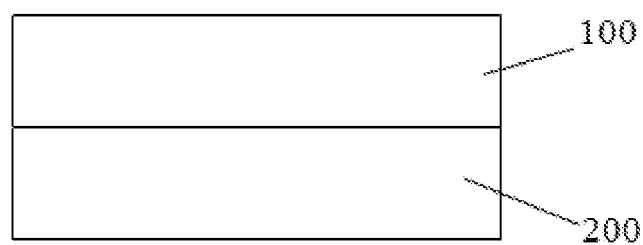
FIG. 7 is a schematic structural view of the liquid crystal display device in the embodiment of the present disclosure.

Further, the present embodiment also provides a liquid crystal display device, referring to FIG. 7, the liquid crystal display device includes a liquid crystal panel 100 and a backlight module 200, the liquid crystal panel 100 is disposed opposite to the backlight module 200, the backlight module 200 provides the light source to the liquid crystal panel 100 for the liquid crystal panel 100 to display the image. Wherein, the liquid crystal panel 100 employs the liquid crystal panel provided in the foregoing embodiment of the present disclosure.

As described above, the liquid crystal panel and the liquid crystal display device provided by the present embodiment are arranged the stripe branches in the pixel electrode in parallel or perpendicular to the horizontal axis (horizontal trunk) direction, And the light absorption axis of the polarizer is set to have an angle greater than 0 and less than 90° with the horizontal axis, it is possible to reduce the light leakage caused by the diffraction of the polarized light by the metal wire in the pixel structure and to improve the contrast.

It is noted that, as used herein, relational terms such as first and second, and the like are merely used to distinguish one entity or another entity operation or operations separate, and do not necessarily require or imply that these entities the actual existence of any such relationship or order between or operations. Moreover, the term "comprising", "including" or any other variation thereof are intended to cover a non-exclusive inclusion, such that a series of factors including the process, method, article, or apparatus includes not only those elements, but also not explicitly listed the other elements, or further including for such process, method, article or device inherent feature. Without more constraints, by the statement "includes a . . . " as defined in the elements, it does not exclude the existence of additional identical elements including the element process, method, article, or apparatus.

The above description is only a specific embodiment of the present application, it should be noted that those of ordinary skill in the art, in the present application without departing from the principles of the premise, but also a number of improvements and modifications can be made, these improvements and modifications are to be considered the scope of the present application.

What is claimed is:

1. A liquid crystal panel comprises a first polarizer, an array substrate, a color film substrate and a second polarizer followed by stacking, liquid crystal molecules are arranged between the color film substrate and the array substrate, a plurality of pixel structures are arranged in the array of the array substrate, the pixel structure comprises a pixel electrode;

wherein, the pixel unit further comprises a common electrode line, the common electrode line and the pixel electrode are arranged in a different layer structure with an insulating layer therebetween; the pixel electrode is divided into a display area and a non-display area, the positive projection of the common electrode line on the pixel electrode is located within the non-display area, and a storage capacitor is formed between common electrode line and the non-display area of the pixel electrode; the display area of the pixel electrode comprises a striped horizontal trunk, a striped vertical trunk, and a plurality of stripe branches divided equally into four quadrant sub-regions between and by the striped horizontal trunk and the striped vertical trunk; the horizontal trunk intersects the vertical trunk at a central position perpendicularly, the display area of the pixel electrode is located at center of the pixel electrode, and the non-display area of the pixel electrode fully surrounds at outside of the display area of the pixel electrode, such that adjacent two sides of one of the four quadrant sub-regions are directly connected to the striped horizontal trunk and the striped vertical trunk, respectively, and another adjacent two sides of the one of the four quadrant sub-regions are directly connected to the non-display area, wherein the adjacent two sides of the one of the four quadrant sub-regions are different from the another adjacent two sides of the one of the four quadrant sub-regions; one end of each of the stripe branches is directly connected to either the horizontal trunk or the vertical trunk, and another end of each of the stripe branches is directly connected to the non-display area, such that one of a plurality of slits is formed between adjacent two of the stripe branches of the one of the four quadrant sub-regions and the slits are disconnected from each other, and the stripe branches, the non-display area, the striped horizontal trunk and the striped vertical trunk are formed as a continuous body;

wherein, the stripe branches located in the first quadrant sub-region and the third quadrant sub-region are perpendicular to the horizontal trunk, the stripe branches located in the second quadrant sub-region and the fourth quadrant sub-region are parallel to the horizontal trunk; or, the stripe branches located in the first quadrant sub-region and the third quadrant sub-region are parallel to the horizontal trunk, the stripe branches located in the second quadrant sub-region and the fourth quadrant sub-region are perpendicular to the horizontal trunk;

wherein the angle between the absorption axis of the first polarizer and the horizontal trunk is $\alpha$, the absorption axis of the second polarizer is perpendicular to the absorption axis of the first polarizer, and $0<\alpha<90°$.

2. The liquid crystal panel according to claim 1, wherein, $30°\leq\alpha\leq60°$.

3. The liquid crystal panel according to claim 1, wherein, $\alpha=45°$.

4. The liquid crystal panel according to claim 1, wherein, the display area of the pixel electrode is rotationally symmetric 90° at its center point.

5. The liquid crystal panel according to claim 1, wherein, the pixel structure further comprises a scan line and a data line, the scan line and the data line intersect each other with a specific pixel unit, the pixel unit comprises a pixel driver and the pixel electrode, the pixel electrode is connected to the scan line and the data line through the pixel driver.

6. The liquid crystal panel according to claim 5, wherein, the pixel driver is a thin film transistor.

7. A liquid crystal display device comprises a liquid crystal panel and a backlight module, the liquid crystal panel is relative arranged with the backlight module, the backlight module provides a display light source to the liquid crystal panel for the liquid crystal panel to display the image, wherein, the liquid crystal panel comprises a first polarizer, an array substrate, a color film substrate and a second polarizer followed by stacking, liquid crystal molecules are arranged between the color film substrate and the array substrate, a plurality of pixel structures are arranged in the array of the array substrate, the pixel structure comprises a pixel electrode; wherein, the pixel unit further comprises a common electrode line, the common electrode line and the pixel electrode are arranged in a different layer structure with an insulating layer therebetween; the pixel electrode is divided into a display area and a non-display area, the positive projection of the common electrode line on the pixel electrode is located within the non-display area, and a storage capacitor is formed between common electrode line and the non-display area of the pixel electrode; the display area of the pixel electrode comprises a striped horizontal trunk, a striped vertical trunk, and a plurality of stripe branches divided equally into four quadrant sub-regions between and by the striped horizontal trunk and the striped vertical trunk; the horizontal trunk intersects the vertical trunk at a central position perpendicularly, the display area of the pixel electrode is located at center of the pixel electrode, and the non-display area of the pixel electrode fully surrounds at outside of the display area of the pixel electrode, such that adjacent two sides of one of the four quadrant sub-regions are directly connected to the striped horizontal trunk and the striped vertical trunk, respectively, and another adjacent two sides of the one of the four quadrant sub-regions are directly connected to the non-display area, wherein the adjacent two sides of the one of the four quadrant sub-regions are different from the another adjacent two sides of the one of the four quadrant sub-regions; one end of each of the stripe branches is directly connected to either the horizontal trunk or the vertical trunk, and another end of each of the stripe branches is directly connected to the non-display area, such that one of a plurality of slits is formed between adjacent two of the stripe branches of the one of the four quadrant sub-regions and the slits are disconnected from each other, and the stripe branches, the non-display area, the striped horizontal trunk and the striped vertical trunk are formed as a continuous body;

wherein, the stripe branches located in the first quadrant sub-region and the third quadrant sub-region are perpendicular to the horizontal trunk, the stripe branches located in the second quadrant sub-region and the fourth quadrant sub-region are parallel to the horizontal trunk; or, the stripe branches located in the first quadrant sub-region and the third quadrant sub-region are parallel to the horizontal trunk, the stripe branches located in the second quadrant sub-region and the fourth quadrant sub-region are perpendicular to the horizontal trunk;

wherein the angle between the absorption axis of the first polarizer and the horizontal trunk is $\alpha$, the absorption axis of the second polarizer is perpendicular to the absorption axis of the first polarizer, and $0<\alpha<90°$.

8. The liquid crystal display device according to claim 7, wherein, $30°\leq\alpha\leq60°$.

9. The liquid crystal display device according to claim 7, wherein, $\alpha=45°$.

10. The liquid crystal display device according to claim 7, wherein, the display area of the pixel electrode is rotationally symmetric 90° at its center point.

11. The liquid crystal display device according to claim 7, wherein, the pixel structure further comprises a scan line and a data line, the scan line and the data line intersect each other with a specific pixel unit, the pixel unit comprises a pixel driver and the pixel electrode, the pixel electrode is connected to the scan line and the data line through the pixel driver.

12. The liquid crystal display device according to claim 11, wherein, the pixel driver is a thin film transistor.

13. The liquid crystal display device according to claim 11, wherein, the pixel unit further comprises a common electrode line, the common electrode line and the pixel electrode are arranged in a different layer structure, the positive projection of the common electrode line on the pixel electrode is located within the non-display area, and a storage capacitor is formed between common electrode line and the non-display area of the pixel electrode.

* * * * *